H. B. Noble.
Revolving Rake.
No. 82,631.            Patented Sep. 29, 1868.
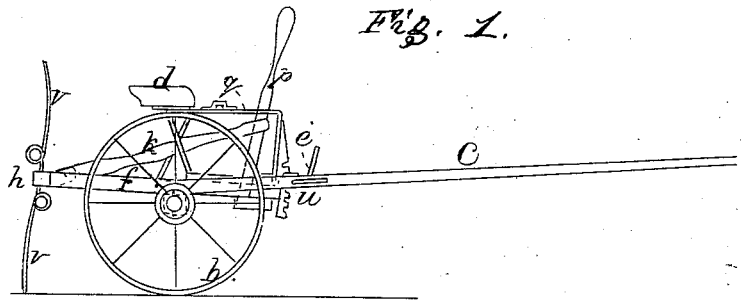
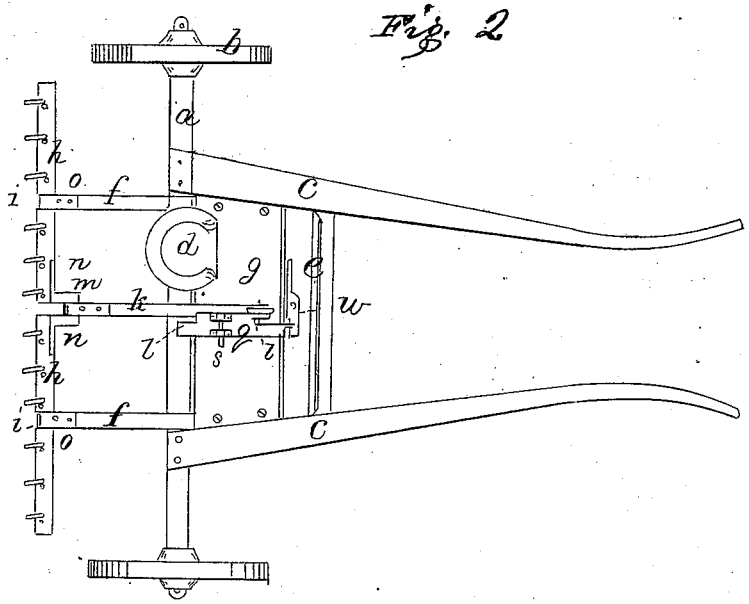
Witness
Inventor
Hezekiah B. Noble

United States Patent Office.

HEZEKIAH B. NOBLE, OF SOUTH WINDSOR, CONNECTICUT.

*Letters Patent No. 82,631, dated September 29, 1868.*

IMPROVEMENT IN HORSE-RAKES.

*The Schedule referred to in these Letters Patent and making part of the same.*

TO ALL WHOM IT MAY CONCERN:

Be it known that I, HEZEKIAH B. NOBLE, of South Windsor, county of Hartford, and State of Connecticut, have invented certain new and useful Improvements in Hay-Rake; and to enable others skilled in the art to make and use the same, I will proceed to describe its construction and operation by referring to the drawings, in which the same letters indicate like parts in each of the figures.

The nature of this invention will be understood from the specification and drawings.

The object desired to be attained thereby is to produce a simple article, efficient and convenient for use, and cheapen the manufacture.

In the accompanying drawings—

Figure 1 is a side elevation.

Figure 2 is a top or plan view.

$a$ is the axle.

$b$ are the wheels.

$c$ are the thills.

$d$ is the driver or operator's seat.

$e$ is a cross-plate and foot-piece to the thills, all of which, thus far, are constructed in the ordinary way.

$f$ are supporting and actuating-bars, having a platform, $g$, secured upon their inner ends, between the thills $c$ and foot-piece $e$. These bars $f$ are secured to and oscillate upon the axle $a$, by means of boxes or straps fitted around the round portion or bearing on the axle, and then secured to the thills by screws or bolts, thus allowing the bars $f$ to play or oscillate freely upon the axle $a$.

$h$ is a rake-head, made in two parts, and secured firmly together by means of a crank, $m$, and plates $n$, and firmly secured or bolted to the inner ends of the rake-head.

This head (having round bearing at $i$) is secured and revolves in boxes or bearings, $o$, formed in the outer ends of the bars $f$.

$k$ is a crank-arm, which holds the rake in a proper or desired position for use or for rest, by means of a lever, $p$, (secured at its lower end in the platform,) and rack-holder, $q$. This lever-holder $q$ is made of a proper width and height, having protuberances or depressions, $r$, to receive and hold the lever $p$ when the rake is in its proper position for raking. It (the rack-holder) is also provided with a fastening-bolt, $s$, which enters the side of the lever, for holding the rake-head in an inoperative position.

$u$ is a ratchet-plate, secured to the front edge of the platform $g$ in a perpendicular position, the object of which is to adjust and hold the rake in its proper position while it is revolving, or in an elevated or nearly a horizontal position with the teeth $v$, by means of a spring or foot-catch, $w$, secured upon the cross-plate $e$.

Thus it will be seen that the mechanism of this rake is reduced to a complete state of simplicity, utility, and durability, thereby rendering it cheap of manufacture and desirable for use.

I believe I have thus shown the nature, construction, and advantage of this invention, so as to enable others skilled in the art to make and use the same therefrom.

What I claim, therefore, and desire to secure by Letters Patent, is—

The crank $m$, plate $n$, head $h$, teeth $v$, (which constitute the rake-head,) in combination with the bars $ff$, rack $u$, pawl $e$, (for elevating or depressing the rake-head,) arms $k$, lever $p$, and holder $q$, all arranged and operating substantially as and for the purpose described.

HEZEKIAH B. NOBLE. [L. S.]

Witnesses:
E. W. BLISS,
JEREMY W. BLISS.